US007713337B2

(12) United States Patent
Toyoda et al.

(10) Patent No.: US 7,713,337 B2
(45) Date of Patent: May 11, 2010

(54) CANISTER DEVICE

(75) Inventors: Kazuki Toyoda, Tokyo (JP); Kaoru Haishi, Fujisawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 263 days.

(21) Appl. No.: 11/961,830

(22) Filed: Dec. 20, 2007

(65) Prior Publication Data

US 2008/0149075 A1 Jun. 26, 2008

(30) Foreign Application Priority Data

Dec. 21, 2006 (JP) ............................ 2006-344294

(51) Int. Cl.
*B01D 53/02* (2006.01)
*F02M 25/08* (2006.01)

(52) U.S. Cl. .......................................... 96/131; 96/133

(58) Field of Classification Search .................. 96/121, 96/131–133, 147; 95/146; 123/519
See application file for complete search history.

(56) References Cited

U.S. PATENT DOCUMENTS

| | | | | |
|---|---|---|---|---|
| 5,337,721 | A * | 8/1994 | Kasuya et al. | 123/519 |
| 5,564,398 | A * | 10/1996 | Maeda et al. | 123/520 |
| 6,343,591 | B1 * | 2/2002 | Hara et al. | 123/519 |
| 6,514,326 | B1 * | 2/2003 | Hara et al. | 96/133 |
| 6,540,815 | B1 * | 4/2003 | Hiltzik et al. | 95/146 |
| 6,695,896 | B2 * | 2/2004 | Hara et al. | 96/121 |
| 7,059,306 | B2 * | 6/2006 | Reddy | 123/518 |
| 7,214,258 | B2 * | 5/2007 | Abidi et al. | 96/131 |
| 2005/0022672 | A1 * | 2/2005 | Loevenbruck et al. | 96/121 |
| 2006/0288872 | A1 * | 12/2006 | Nakano | 96/108 |
| 2007/0119306 | A1 * | 5/2007 | Yamada et al. | 96/131 |
| 2007/0266997 | A1 * | 11/2007 | Clontz et al. | 123/519 |

FOREIGN PATENT DOCUMENTS

JP 2006-205751 A 8/2006

OTHER PUBLICATIONS

English language abstract of JP2006205751 (1 page), 2006.

* cited by examiner

*Primary Examiner*—Frank M Lawrence
(74) *Attorney, Agent, or Firm*—Osha • Liang LLP

(57) ABSTRACT

A canister device includes a main canister, a sub-canister, and a hose. The main canister includes a charging port, a purging port, and a main canister-side connection port. The sub-canister is separated from the main canister and located on a side of the main canister, and includes a drain port opened to the atmosphere and disposed on the same side as the main canister-side connection port of the main canister and a sub-canister side connection port disposed on the opposite side from the drain port. The hose provides fluid communication between the main canister-side connection port and the sub-canister-side connection port.

20 Claims, 4 Drawing Sheets

CANISTER DEVICE

PRIORITY APPLICATION

This application claims priority from Japanese Patent Application Nos. 2006-344294, filed Dec. 21, 2006, the contents of which are hereby incorporated by reference in their entirety.

BACKGROUND OF INVENTION

1. Field of the Invention

The present invention relates to a canister device for temporarily absorbing fuel to supply fuel evaporated from a fuel tank to a suction passage.

2. Description of the Related Art

In the related art, a canister includes an atmosphere-side tubular portion and an opposite device-side tubular portion. Both tubular portions are in fluid communication with each other in the bottoms thereof to enhance processing capacity. Such a canister is disclosed in Japanese Patent Application No. 2005-16329.

In a gas/electric hybrid vehicle and an idle-stop vehicle (i.e. a vehicle that turns off the engine when the vehicle is stopped), there may be limited opportunity for vaporized fuel absorbed by the canister to be processed for its desorption. In such situations, enhancement of the vaporized fuel absorption performance of the canister is beneficial to avoid releasing vaporized fuel into the atmosphere.

SUMMARY OF THE INVENTION

In accordance with embodiments of the present invention, a canister device is provided. The canister device includes a main canister, a sub-canister, and a hose. The main canister includes a charging port, a purging port, and a main canister-side connection port. The sub-canister is separated from the main canister and located on a side of the main canister, and includes a drain port opened to the atmosphere and disposed on the same side as the main canister-side connection port of the main canister and a sub-canister side connection port disposed on the opposite side from the drain port. The hose provides fluid communication between the main canister-side connection port and the sub-canister-side connection port.

In accordance with embodiments of the present invention, a canister device is provided. The canister device includes a main canister, a sub-canister. The main canister includes charging means for fluid communication with a fuel tank, purging means for fluid communication with an engine, and a main canister-side connection port. The sub-canister is separated from the main canister and located on a side of the main canister, and includes a drain port opened to the atmosphere and disposed on the same side as the main canister-side connection port of the main canister and a sub-canister side connection port disposed on the opposite side from the drain port. The canister device further includes connection means for providing fluid communication between the main canister-side connection port and the sub-canister-side connection port.

Other aspects and advantages of the invention will be apparent from the following description and the appended claims.

DETAILED DESCRIPTION

Figure 1A:
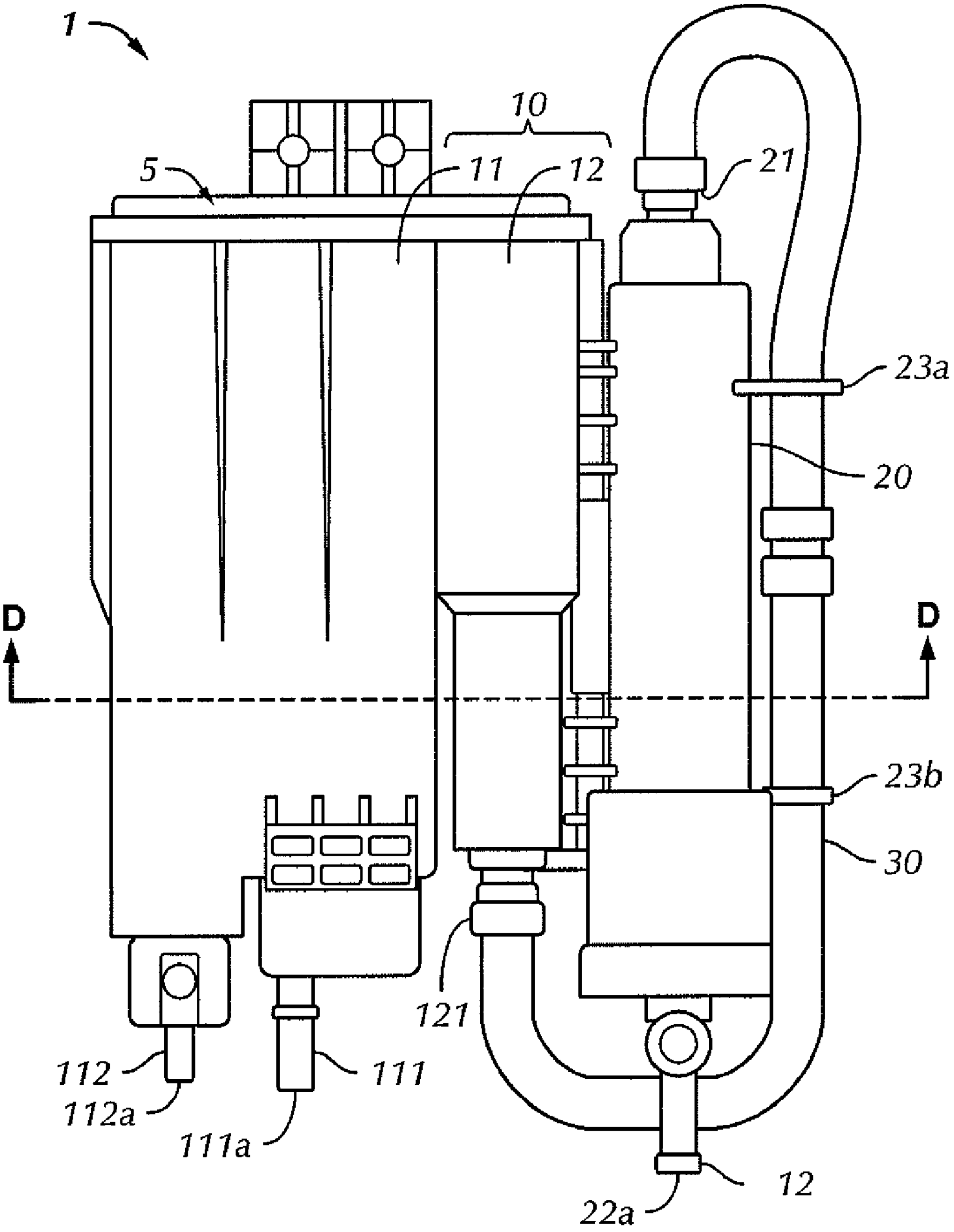
FIG. 1A is a plan view of a canister in accordance with an embodiment of the present invention.
Figure 1B:
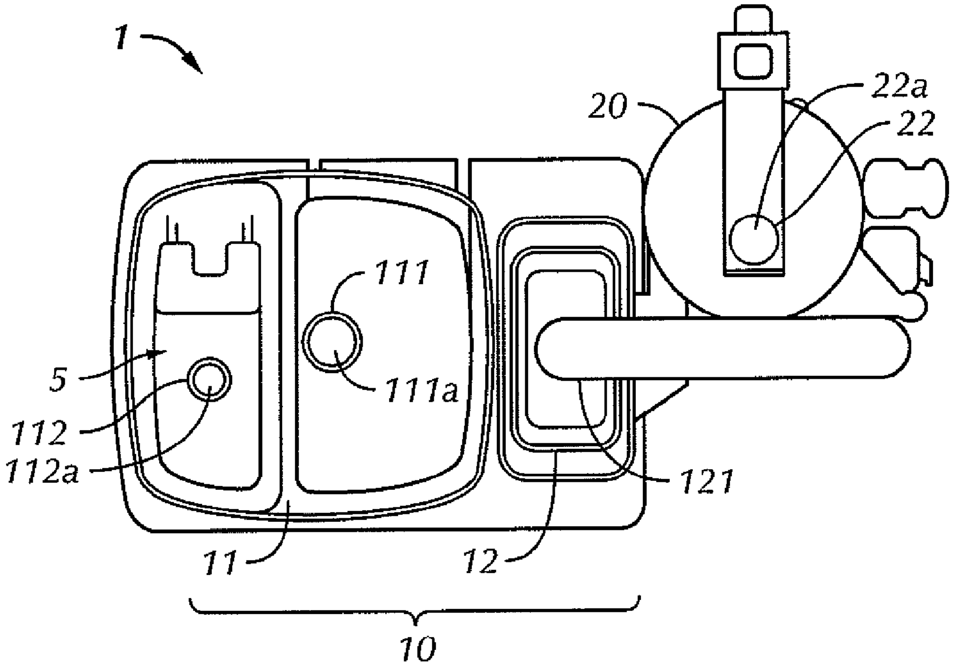
FIG. 1B is a front view of the canister shown in FIG. 1A.
Figure 1D:
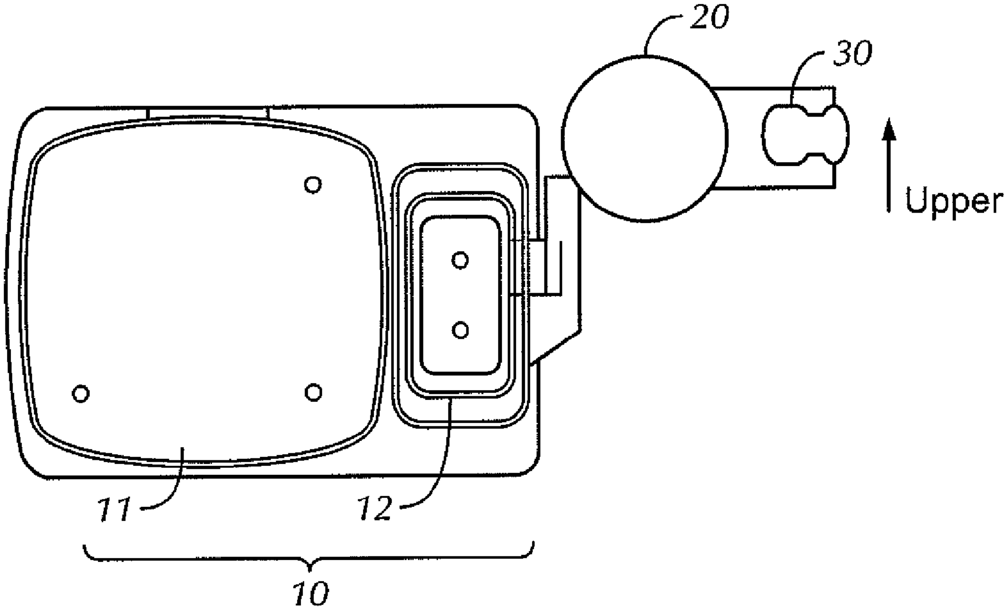
FIG. 1D is a cross-sectional view taken along line D-D of FIG. 1A.
Figure 1C:
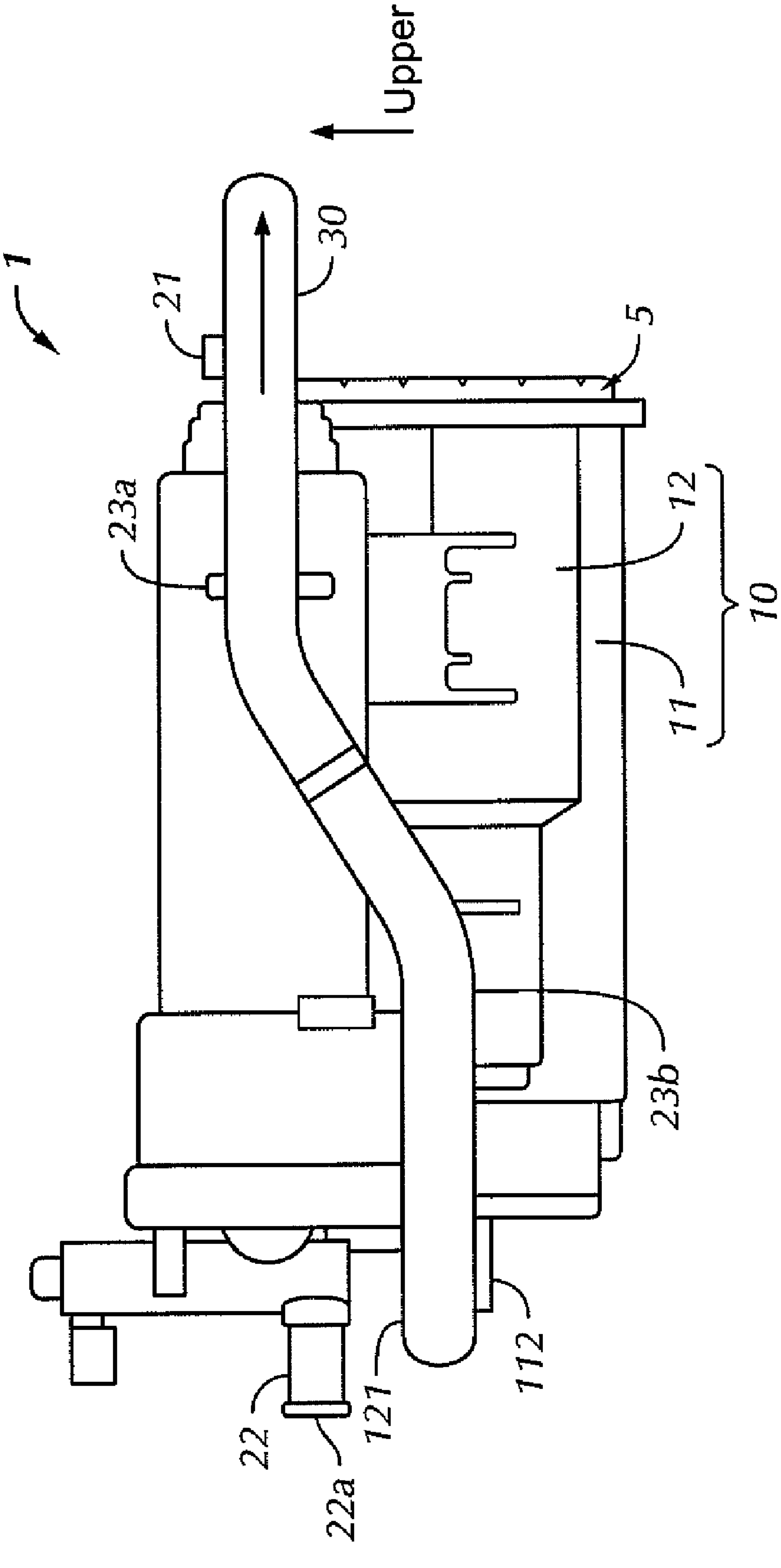
FIG. 1C is a side view of the canister shown in FIG. 1A.

In FIGS. 1A-1D, a canister in accordance with an embodiment of the present invention is shown. When the canister is assembled into a vehicle, the upper directions in FIGS. 1B, 1C and 1D are each coincident with the upper direction of the vehicle. The upper direction of the vehicle is shown in the figures.

The canister 1 shown in FIGS. 1A-1D includes a main canister 10 and a sub-canister 20 interconnected by a hose 30. In the embodiment, the sub-canister 20 is used in addition to the main canister 10. The additional capacity provided by the sub-canister 20 may, for example, be useful for hybrid vehicles or idle-stop vehicles, which generally need greater canister capacity than vehicles that do not turn off their engines during use.

When a capacity-increased canister exclusively used for hybrid vehicles is designed for use in place of the canister developed for normal engines, the cost can increase as a result of the specialized design and lower production quantities. To avoid this, the embodiment shown in FIGS. 1A-1D may use a sub-canister in addition to the same main canister as that in the normal engine.

The main canister 10 includes a first body 11 and a second body 12. The main canister 10 is a so-called U-turn canister having a communication path interconnecting the bottoms 5 of the first body 11 and the second body 12, through which the vaporized fuel flows. The first body 11 and the second body 12 contain vaporized fuel absorbing material of, for example, activated carbon. As shown in FIG. 1D, the centers of the first body 11 and the second body 12 are substantially aligned.

As shown in FIG. 1A, a charging pipe 111 and a purging pipe 112 protrude from the side of the first body 11, which is opposite to the bottom 5 side thereof. An opening of the charging pipe 111 is a charging port 111*a*. An opening of the purging pipe 112 is a purging port 112*a*, A connection pipe 121 protrudes from the side of the second body 12, which includes the charging port 111*a* and the purging port 112*a* (opposite to the bottom 5). An opening part of the connection pipe 121 is a connection port.

The sub-canister 20, as shown in FIG. 1A, is arranged in parallel with the main canister 10. The sub-canister 20 is provided with a connection pipe 21 and a drain pipe 22. The connection pipe 21 may be located at the end of the sub-canister 20 that is opposite to the connection pipe 121 of the main canister 10. An opening of the connection pipe 21 is a connection port. The drain pipe 22 protrudes from the side opposite to the connection pipe 21. An opening of the drain pipe 22 is a drain port 22*a*. The sub-canister 20 may contain an activated carbon shaped in a honeycomb. The honeycomb of activated carbon may extend from the connection pipe 21 to the drain port 22*a* to reduce pressure loss when air passes.

The connection pipe 121 of the main canister 10 is coupled to the connection pipe 21 of the sub-canister 20 by the hose 30. The hose 30 is made of rubber, for example. When viewed from top in FIG. 1A, the hose 30 takes a C-shape while extending by the sub-canister 20. C-shaped arms 23*a* and 23*b* each opened at the top end may be integrally coupled to the side of the sub-canister 20. The hose 30 is firmly held within the C-shaped arms 23*a* and 23*b*. In FIG. 1A, the C-shaped arm 23*a* is positioned at a point distanced from the connection pipe 21 by about ¼ of the entire length of the sub-canister 20. The C-shaped arm 23*b* is positioned at a point distanced from the drain pipe 22 by about ¼ of the entire length of the sub-canister 20. Those having ordinary skill in the art will appreciate that scope of the present invention is not limited by the manner in which the hose 30 is held in place relative to the sub-canister 20.

In an installed position, the connection pipe 21 of the sub-canister 20, as shown in FIG. 1C, is higher than the connection pipe 121 of the main canister 10. To connect the connection pipe 121 and the connection pipe 21, which are thus positioned, the hose 30 is at almost the same height as the connection pipe 121 near its connection part to the connection pipe 121, and then tilted to reach almost the same height as the connection pipe 21 near its connection part to the connection pipe 21. The tilted portion of the hose 30 is located between the C-shaped arms 23*a* and 23*b* (FIG. 1A). The C-shaped arms 23*a* and 23*b* act as clamps to hold the hose 30 at a substantially fixed height.

Figure 2:
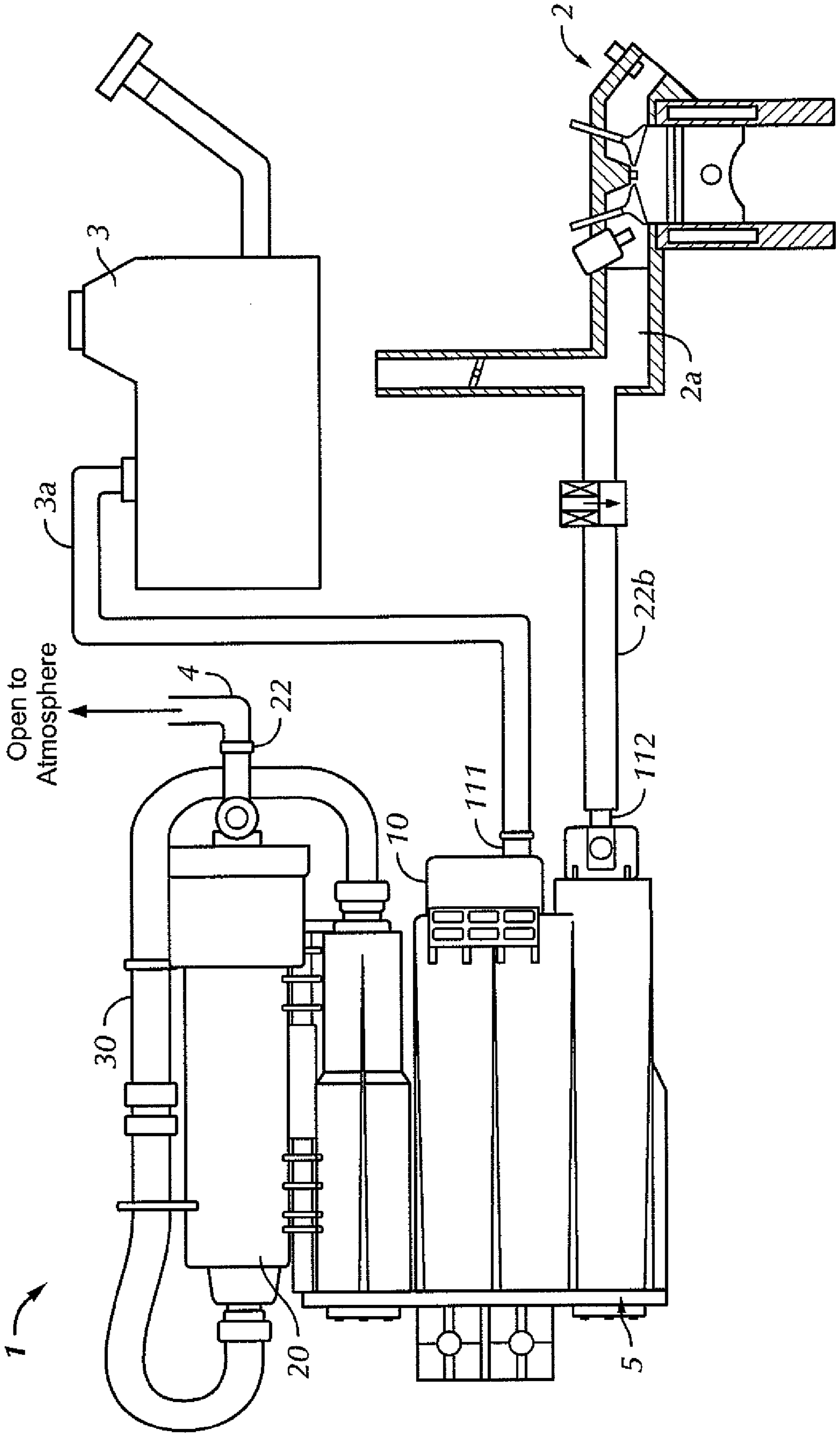
FIG. 2 is a schematic of the canister of FIG. 1A in use with a vehicle in accordance with an embodiment of the present invention.

In FIG. 2, a canister in accordance with an embodiment of the present invention is applied to a vehicle. As shown, the charging pipe 111 of the canister 1 is in fluid communication with a fuel tank 3 through a charging pipe 3*a*. Vaporized fuel generated in the fuel tank 3 flows from the charging pipe 111 to the main canister 10 of the canister 1, through the charging pipe 3*a*, and is absorbed by the vaporized-fuel absorbing material. The vaporized fuel still left after passing through the main canister 10 flows through the hose 30 and is absorbed by the sub-canister 20.

The purging pipe 112 is in fluid communication with a suction passage 2*a* of the engine 2 through a purging pipe 2*b*. The drain pipe 22 is in fluid communication with an opened-to-atmosphere pipe 4. To treat the fuel having been absorbed into the vaporized-fuel absorbing material, a suction negative pressure of the engine 2 is introduced into the canister 1. Upon introduction of the negative pressure, the absorbed fuel is sucked into the engine 2 through the purging pipe 112 together with the air introduced through the opened-to-atmosphere pipe 4, and combusted in the engine 2.

The canister device in accordance with embodiments disclosed herein may provide one or more of the following advantages.

With reference to FIG. 2. the canister 1 is mounted to the vehicle by coupling the canister to the charging pipe 3*a*, the purging pipe 2*b* and the opened-to-atmosphere pipe 4, which are fixed to the vehicle body. In most cases, the canister 1 is located near the fuel tank 3. In the case of the front engine vehicle, the canister is mounted on the rear side of the rear seat (the under part of the trunk room). Accordingly, it is required that the worker mounts the canister 1 to the vehicle from the underside of the vehicle. This makes it difficult for the worker to mount the canister.

It is noted that in the canister 1 of the embodiment, the charging pipe 111, the purging pipe 112, and the drain pipe 22 are located on the same side and parallel to one another. With this structural feature, when the worker mounts the canister 1 to the vehicle in the assembling plant or replaces it with a new one in a maintenance factory, it is easy for the worker to connect the charging pipe 3*a* to the charging pipe 111, to connect the purging pipe 2*b* to the purging pipe 112, and to connect the opened-to-atmosphere pipe 4 to the drain pipe 22.

The canister of the embodiment is arranged such that the connection pipe 121 on the front side of the main canister 10 is coupled to the connection pipe 21 on the rear side of the sub-canister 20 by the hose 30. Accordingly, the overall length of the hose 30 is long. The canister absorbs the vaporized fuel generated in the fuel tank, sucks air when a predetermined desorption condition holds, and feeds the fuel together with the air to the engine to combust it. When the fuel desorption is taken into consideration, the canister first desorbs the vaporized fuel in a place where the concentration of the vaporized fuel is high. Therefore, if the main canister 10 is located close to the sub-canister 20, the following problem arises.

When the vaporized fuel is desorbed from the sub-canister 20, the fuel desorption is affected by the main canister 10, and the desorption is performed first in the main canister 10 having high absorption fuel concentration. In such a case, if the engine stops in a state that the vaporized fuel desorption from the canister is insufficient, the desorption amount of the vaporized fuel from the main canister 10 is large, but the desorption amount from the sub-canister 20 is not large enough. When in such a state, fuel evaporates from the fuel tank again and the amount of vaporized fuel reaches the absorption capacity of the main canister 10, the fuel that is absorbed in the previous absorption is still left in the sub-canister 20, and the absorption capacity of the sub-canister 20 is small. As a result, there is a risk that the vaporized fuel is released to the atmosphere.

To minimize or avoid the release of vaporized fuel, the canister 1 may be arranged such that the entire length of the hose 30 is selected to be long so as to connect the connection pipe 121 on the front side of the main canister 10 to the connection pipe 21 on the rear side of the sub-canister 20. As a result, the distance between the main canister 10 and the sub-canister 20 is increased to thereby isolate the desorbing operation in the sub-canister 20 from the fuel having been absorbed to the main canister 10. With such a structural arrangement, the vaporized fuel is easily desorbed from the sub-canister 20. Even after the main canister 10 absorbs the fuel up to its full absorption capacity, the sub-canister 20 shows its fuel absorption ability satisfactorily, and the vaporized fuel is not released to the atmosphere.

Further, it is noted that in the embodiment, the connection pipe 21 of the sub-canister 20 is located at a position higher than the connection pipe 121 of the main canister 10. Since the specific gravity of the vaporized fuel is greater than that of air, the vaporized fuel left after passing through the main canister 10 is hard to flow to the sub-canister 20 and tends to stay in the hose 30. This results in enhancement of the vaporized fuel absorbing ability of the sub-canister 20.

Further, since the connection pipe 21 of the sub-canister 20 is located at a position higher than the connection pipe 121 of the main canister 10, the hose 30 has a tilted portion. The condensed fuel flows down along the tilted part and tends to stay in the hose 30.

In the embodiment, the tilted portion of the hose 30 lies between the C-shaped arms 23*a* and 23*b*, namely, the hose 30 has a length half of the entire length of the sub-canister 20. In an alternative, the tilted portion of the hose 30 may be formed over the entire length of the sub-canister 20. In this case, the condensed fuel is easy to flow down and the fuel is easily absorbed by the main canister 10. If the tilted portion of the hose 30 is shortened and the hose 30 is bent at almost a right angle to be stepped, the air passage resistance increases. In this case, the flow of the vaporized fuel to the sub-canister 10 after passing through the main canister 10 is impeded. Thus, depending on the length of the tilted portion of the hose 30, the vaporized fuel is hard to reach the sub-canister 20 or the vaporized fuel, after condensed, is easy to flow down to the main canister 10. Accordingly, the tilted portion of the hose 30 may be selected according to the characteristics of the engine. In the canister 1 illustrated in FIG. 1, the two cases just mentioned are well balanced.

In the embodiment, the hose 30 is held with the C-shaped arms 23*a* and 23*b* each opened at the top end, which act as clamps. Accordingly, the hose 30 may be attached by merely fitting the hose 30 into those C-shaped arms to facilitate assembling work. In this respect, the assembling work is easy. When the C-shaped arms are provided on the lower part of the sub-canister 20, there is a possibility that the hose 30 drops. In the embodiment, the C-shaped arms are provided on the side of the sub-canister 20. Therefore, there is no possibility that the hose 30 drops. In the embodiment, with provision of the C-shaped arms, the mounting work of the hose 30 and the maintenance performance are both enhanced without any contradiction.

It is to be understood that the invention is not limited to the illustrated and described forms of the invention contained herein. It will be apparent to those skilled in the art that various alterations and modification may be made without departing from the scope of the invention, and the invention is not considered limited to what is shown in the drawing and described in the specification. Accordingly, the scope of the invention should be limited only by the attached claims.

What is claimed is:

1. A canister device comprising:

a main canister comprising a charging port, a purging port, and a main canister-side connection port;

a sub-canister, separated from the main canister and located on a side of the main canister, wherein the sub-canister comprises, a drain port opened to the atmosphere and disposed on the same side as the main canister-side connection port of the main canister and a sub-canister side connection port disposed on the opposite and far side from the main canister-side connection port; and a hose providing fluid communication between the main canister-side connection port and the sub-canister-side connection port.

2. The canister device according to claim 1, wherein the charging port, the purging port, and the main canister-side connection port are provided on one side of the main canister.

3. The canister device according to claim 1, wherein the main canister is a U-turn structure canister comprising a first body having the charging port and the purging port, and a second body having the main canister connection port located on the side opposite to the bottom thereof, wherein the second body and the first body are in fluid communication with each other at the bottoms thereof.

4. The canister device according to claim 1, wherein the sub-canister-side connection port is located at a position higher than the main canister-side connection port in an installed position, and the hose connects the sub-canister-side connection port and the main canister-side connection port.

5. The canister device according to claim 4, wherein the hose extends at almost the same height as the main canister-side connection port near the main canister-side connection port, then extends at a tilt and reaches almost the same height as the main canister-side connection port, and then further extends at almost the same height as the sub-canister-side connection port and connected to the sub-canister-side connection port.

6. The canister device according to claim 4, wherein the hose extends at almost the same height as the main canister-side connection port near the main canister-side connection port, then is stepped and reaches almost the same height as the main canister-side connection port, and then further extends at almost the same height as the sub-canister-side connection port and connected to the sub-canister-side connection port.

7. The canister device according to claim 4, wherein the hose is tilted at a fixed inclination over a range from a position near the main canister-side connection port to a position near the sub-canister-side connection port.

8. The canister device according to claim 1, further comprising:

arms opened at the top ends, located on the side of the sub-canister, and wherein the hose is inserted into the arms and held in place.

9. The canister device according to claim 1, wherein the charging port is an opening of a charging pipe protruding from the main canister, the purging port is an opening of a purging pipe protruding from the main canister and arranged parallel to the charging pipe, and the drain port is an opening for a drain pipe protruding from the sub-canister and arranged parallel to the charging pipe and the purging pipe.

10. A canister device comprising:

a main canister comprising charging means for fluid communication with a fuel tank, purging means for fluid communication with an engine, and a main canister-side connection port;

a sub-canister, separated from the main canister and located on a side of the main canister, wherein the sub-canister comprises, a drain port opened to the atmosphere and disposed on the same side as the main canister-side connection port of the main canister and a sub-canister side connection port disposed on the opposite and far side from the main canister-side connection port; and connection means for providing fluid communication between the main canister-side connection port and the sub-canister-side connection port.

11. The canister device according to claim 10, wherein the connection means extends at almost the same height as the main canister-side connection port near the main canister-side connection port, then extends at a tilt and reaches almost the same height as the main canister-side connection port, and then further extends at almost the same height as the sub-canister-side connection port and connected to the sub-canister-side connection port.

12. The canister device according to claim 10, wherein the connection means extends at almost the same height as the main canister-side connection port near the main canister-side connection port, then is stepped and reaches almost the same height as the main canister-side connection port, and then further extends at almost the same height as the sub-canister-side connection port and connected to the sub-canister-side connection port.

13. A canister device which is installed into a vehicle comprising:

a main canister comprising a charging port, a purging port, and a main canister-side connection port;

a sub-canister, separated from the main canister and located on a side of the main canister, wherein the sub-canister comprises, a drain port opened to the atmosphere and disposed on the same side as the main canister-side connection port of the main canister and a sub-canister side connection port disposed on the opposite side from the drain port, wherein the sub-canister-side connection port is located at a position higher in the vehicle vertical direction than the main canister-side connection port when in an installed position; and a hose providing fluid communication between the main canister-side connection port and the sub-canister-side connection port.

14. The canister device according to claim 13, wherein the hose extends at almost the same height as the main canister-side connection port near the main canister-side connection port, then extends at a tilt and reaches almost the same height as the main canister-side connection port, and then further extends at almost the same height as the sub-canister-side connection port and connected to the sub-canister-side connection port.

15. The canister device according to claim 13, wherein the hose extends at almost the same height as the main canister-side connection port near the main canister-side connection port, then is stepped and reaches almost the same height as the main canister-side connection port, and then further extends at almost the same height as the sub-canister-side connection port and connected to the sub-canister-side connection port.

16. The canister device according to claim 13, wherein the hose is tilted at a fixed inclination over a range from a position near the main canister-side connection port to a position near the sub-canister-side connection port.

17. A canister device which is installed into a vehicle comprising:

a main canister comprising charging means for fluid communication with a fuel tank, purging means for fluid communication with an engine, and a main canister-side connection port;

a sub-canister, separated from the main canister and located on a side of the main canister, wherein the sub-canister comprises, a drain port opened to the atmosphere and disposed on the same side as the main canister-side connection port of the main canister and a sub-canister side connection port disposed on the opposite side from the drain port, wherein the sub-canister-side connection port is located at a position higher in the vehicle vertical direction than the main canister-side connection port when in an installed position; and connection means for providing fluid communication between the main canister-side connection port and the sub-canister-side connection port.

18. The canister device according to claim 17, wherein the connection means extends at almost the same height as the main canister-side connection port near the main canister-side connection port, then extends at a tilt and reaches almost the same height as the main canister-side connection port, and then further extends at almost the same height as the sub-canister-side connection port and connected to the sub-canister-side connection port.

19. The canister device according to claim 17, wherein the connection means extends at almost the same height as the main canister-side connection port near the main canister-side connection port, then is stepped and reaches almost the same height as the main canister-side connection port, and then further extends at almost the same height as the sub-canister-side connection port and connected to the sub-canister-side connection port.

20. The canister device according to claim 17, wherein the connection means is tilted at a fixed inclination over a range from a position near the main canister-side connection port to a position near the sub-canister-side connection port.

* * * * *